United States Patent [19]

Chern

[11] Patent Number: 5,126,590
[45] Date of Patent: Jun. 30, 1992

[54] HIGH EFFICIENCY CHARGE PUMP

[75] Inventor: Wen-Foo Chern, Boise, Id.

[73] Assignee: Micron Technology, Inc., Boise, Id.

[21] Appl. No.: 716,697

[22] Filed: Jun. 17, 1991

[51] Int. Cl.$^5$ ............................................... G05F 3/08
[52] U.S. Cl. ............................. 307/296.2; 307/296.1; 307/296.8; 307/304
[58] Field of Search ............... 307/296.2, 296.1, 296.8, 307/304

[56] References Cited

U.S. PATENT DOCUMENTS

| | | | |
|---|---|---|---|
| 4,307,333 | 12/1981 | Hargrove | 307/296.2 |
| 4,740,715 | 4/1988 | Okada | 307/296.2 |
| 4,935,644 | 6/1990 | Tsujimoto | 307/296.2 |
| 4,961,007 | 10/1990 | Kumanaya et al. | 307/296.2 |
| 5,029,282 | 7/1991 | Ito | 307/296.8 |

OTHER PUBLICATIONS

Y. Nakagome, et al., A 1.5V Circuit Technology for 64Mb DRAMs, *IEEE* 1990 Symposium on VLSI Circuits, Feb., 1990, pp. 17-18.
Y. Nakagome, et al., An Experimental 1.5-V 64-Mb DRAM, *IEEE Journal of Solid State Circuits*, vol. 26, No. 4, Apr., 1991, pp. 465-472.

*Primary Examiner*—John S. Heyman
*Assistant Examiner*—Scott A. Ouellette
*Attorney, Agent, or Firm*—Marger, Johnson, McCollom & Stolowitz

[57] ABSTRACT

A high efficiency charge pump includes first and second charging transistors for delivering current to a substrate or well and first and second capacitors respectively coupled to the first and second charging transistors. A control circuit coupled to the first and second charging transistors discharges the first capacitor through the first charging transistor and precharges the second capacitor during a first half-cycle of a ring oscillator output signal. The control circuit discharges the second capacitor through the second charging transistor and precharges the first capacitor during a second half-cycle of the ring oscillator output signal. The control circuit also includes first and second symmetrical halves respectively coupled to third and fourth capacitors. The first, second, third, and fourth capacitors are energized by a four-phase clock signal.

23 Claims, 6 Drawing Sheets

HIGH EFFICIENCY CHARGE PUMP

BACKGROUND OF THE INVENTION

This invention pertains to charge pumps for biasing a semiconductor substrate, well, or the like, and more particularly, to a method and apparatus for efficiently, and therefore more quickly, biasing the substrate or well to a final desired voltage.

Charge pumps are well known in the art as an on-chip voltage generator capable of providing a voltage more positive than the most positive external supply voltage and/or negative voltage in the absence of a negative external supply voltage. The advantages of charge pumps are also well known in the art such as providing a bias voltage for the substrate of an integrated circuit or N-type and P-type wells, or for providing greater output voltage swings, among other advantages.

Figure 1:
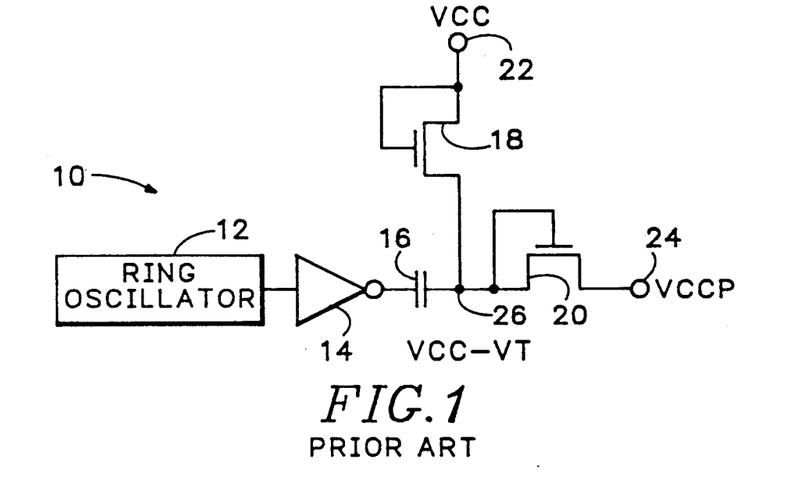
FIG. 1 is a combined block/schematic diagram of a prior art charge pump.

Most charge pumps comprise some variation of the basic charge pump 10 shown in the schematic diagram of FIG. 1. The basic charge pump 10 configuration includes a ring oscillator 12 that provides a square wave or pulse train having voltage swings typically between ground and the most positive external power supply voltage, VCC. An invertor 14, buffer amplifier, or Schmitt trigger circuit may be used to sharpen the edges of the oscillating output signal of the ring oscillator 12. A capacitor 16 is discharged into the substrate 24 through diode-connected transistors 18 and 20. (Typically the drain and gate of a diode-connected transistor are coupled together to form the anode of a diode and the source forms the cathode of the diode.) Transistor 18 is coupled to the external power supply voltage, VCC, at terminal 22. When the ring oscillator 12 produces a voltage close to ground, circuit node 26 is approximately at the voltage of the power supply minus a transistor threshold voltage, VCC−VT. When the ring oscillator 12 produces a voltage close to VCC, the incremental charge on the capacitor 16 is delivered to the substrate 24. Capacitor 16 is prevented from discharging to any other circuit node by the reverse bias on diode-connected transistors 18 and 20.

In the charge pump 10, one pulse of current is delivered to the substrate 24 for every clock cycle of the ring oscillator. Therefore, charge pump 10 has an active half-cycle in which current is delivered to the substrate 24, and the charge asymptotically reaches the final desired voltage. However, charge pump 10 also has an inactive half-cycle in which capacitor 16 is precharged for the next active half-cycle. Although this inactive half-cycle is necessary to precharge the capacitor 16, no current is delivered to the substrate or well 24, which delays the attainment of the final desired voltage. In addition, the voltage across capacitor 16 is limited to VCC−VT due to the voltage drop across transistor 18.

In most integrated electronic circuits, such as a memory chip, it is desirable that the final voltage at the substrate or well be reached as quickly as possible. Proper device functions and attributes, such as the integrity of stored data, cannot be guaranteed until the substrate or well has reached the final value. Therefore, what is desired is a charge pump that more efficiently delivers current to a substrate or well in order to more quickly achieve a desired level of voltage bias.

SUMMARY OF THE INVENTION

It is therefore an object of the present invention to provide a method and apparatus that can be fabricated on a semiconductor integrated circuit for efficiently delivering charge to a semiconductor substrate, well, or the like.

It is another object of the present invention to quickly bias the semiconductor substrate or well of an integrated circuit such that the guaranteed circuit performance can be more quickly achieved.

It is still another object of the present invention to inject two current pulses into the substrate or well for each cycle of the ring oscillator output signal.

It is still another object of the present invention to increase the voltage across the charging capacitors of the charge pump, and thus the available charge that is delivered to the substrate or well.

It is an advantage of the present invention that a circuit embodying the principles of the invention is easily fabricated in an integrated circuit without occupying excessive die area.

It is another advantage of the present invention that the size of the charging transistors necessary to bias a given substrate or well can be reduced.

According to the present invention, a high efficiency charge pump includes first and second charging transistors for delivering current to a substrate or well and first and second capacitors respectively coupled to the first and second charging transistors. A control circuit coupled to the first and second charging transistors discharges the first capacitor through the first charging transistor and precharges the second capacitor during a first half-cycle of a ring oscillator output signal. The control circuit discharges the second capacitor through the second charging transistor and precharges the first capacitor during a second half-cycle of the ring oscillator output signal. In a preferred embodiment, the control circuit includes first and second symmetrical halves respectively coupled to third and fourth capacitors. To realize the control function, the first, second, third, and fourth capacitors are energized by a four-phase clock signal.

The foregoing and other objects, features and advantages of the present invention are more readily apparent from the following detailed description of a preferred embodiment that proceeds with reference to the drawings.

DETAILED DESCRIPTION

The following detailed description describes an N-channel charge pump for generating a positive voltage greater than the voltage of an external positive power supply, VCC. A positive voltage is desirable for biasing an N-type substrate or well. It is apparent to those skilled in the art that a P-channel version of the charge pump can be constructed to generate a negative voltage for biasing a P-type substrate or well to a negative voltage in the absence of an external negative supply voltage. After the N-channel charge pump is described, the desirable changes to the circuit configuration for the P-channel charge pump are described.

Figure 2:
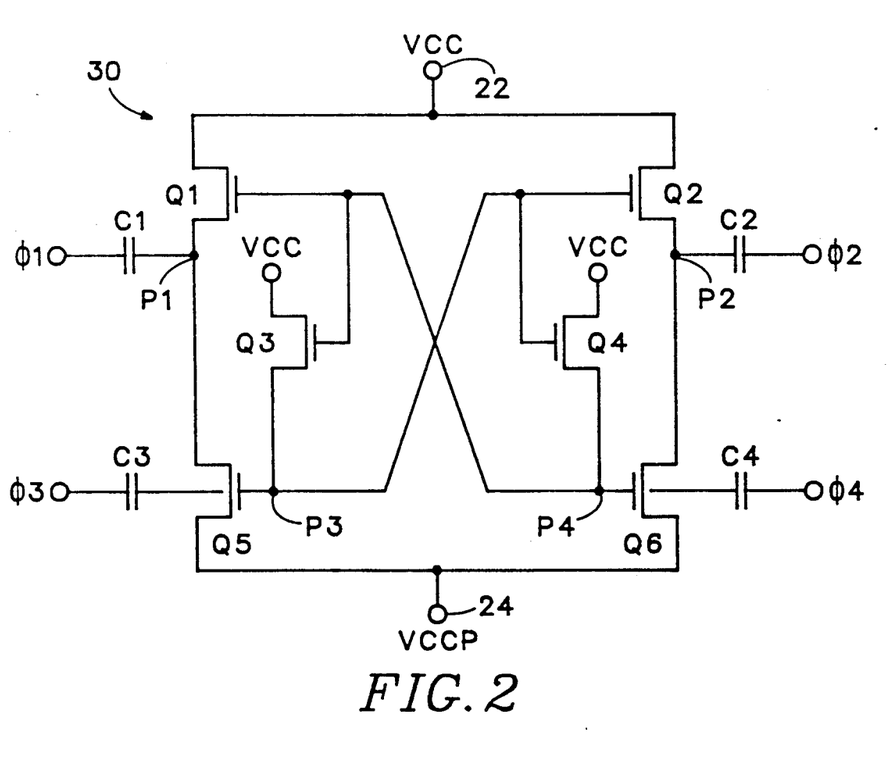
FIG. 2 is a schematic diagram of the charge pump according to the present invention.

Referring now to FIG. 2, the basic circuit configuration of a high efficiency charge pump 30 includes transistors Q1-Q6. Each transistor is desirably an N-channel field-effect transistor ("FET") having a gate, a first current node (drain), and a second current node (source). Since an FET is typically a symmetrical device, the designation of "source" and "drain" is only possible once a voltage is impressed on the terminals. Charge pump 30 further includes capacitors C1-C4 and an output terminal 24 for biasing a semiconductor substrate or well. The drains of transistors Q1-Q4 are coupled together and to a source of positive supply voltage, VCC, at terminal 22. The value of VCC is typically five volts, or about three volts for highly integrated, sub-micron circuits and systems. In charge pump 30, the source of transistor Q1 and the drain of transistor Q5 are coupled together and to one end of capacitor C1 at circuit node P1. The other end of capacitor C1 receives a first clock signal, designated ϕ1. The source of transistor Q2 and the drain of transistor Q6 are coupled together and to one end of capacitor C2 at circuit node P2. The other end of capacitor C2 receives a second clock signal, designated ϕ2. The source of transistor Q3 and the gates of transistors Q2, Q4, and Q5 are coupled together and to one end of capacitor C3 at circuit node P3. The other end of capacitor C3 receives a third clock signal, designated ϕ3. The source of transistor Q4 and the gates of transistors Q1, Q3, and Q6 are coupled together and to one end of capacitor C4 at circuit node P4. The other end of capacitor C4 receives a fourth clock signal, designated ϕ4. The sources of transistors Q5 and Q6 are coupled together and to output terminal 24 that is coupled to the substrate or well. Transistors Q5 and Q6 are charging transistors that deliver current to the substrate or well. The substrate or well is ultimately biased to a voltage, VCCP, that is more positive than the external power supply voltage VCC. The final value of the boosted voltage VCCP is theoretically equal to 2 VCC−VT.

Figure 3:
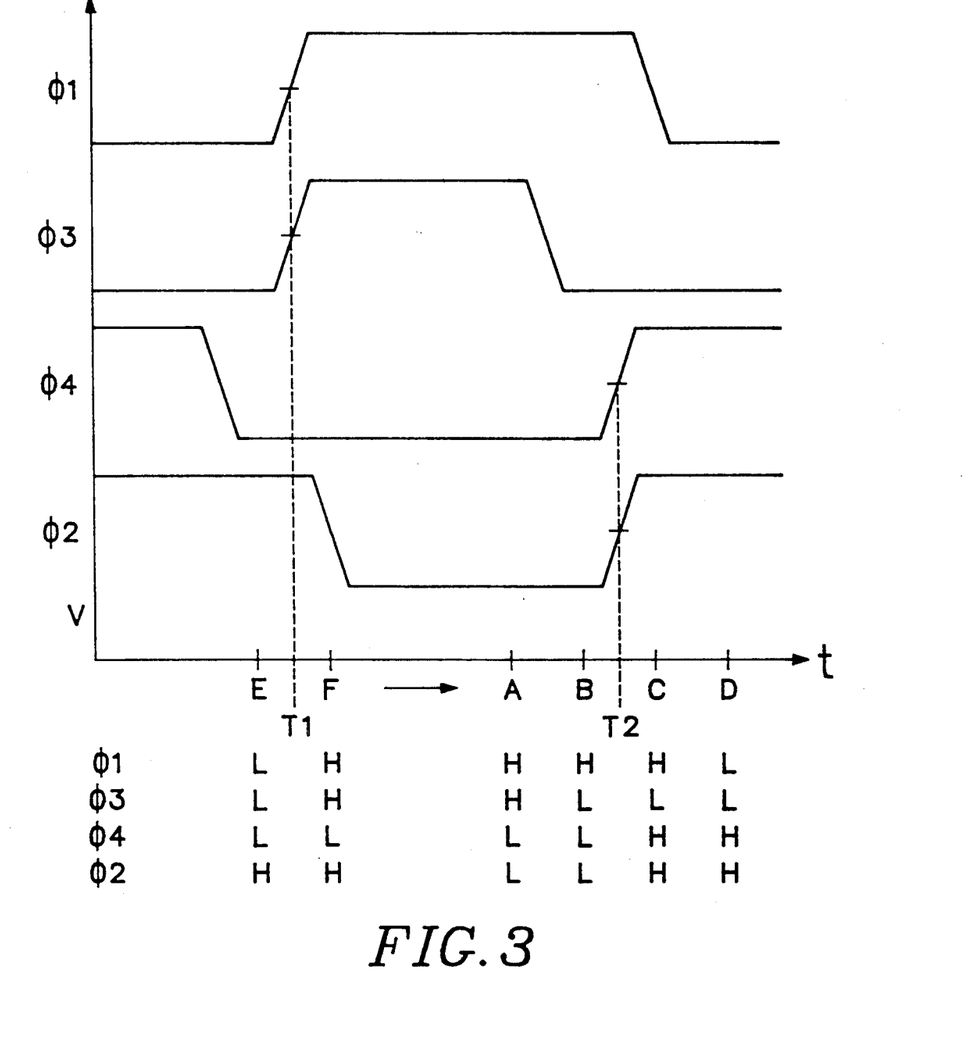
FIG. 3 is a combined timing diagram and table illustrating the phase relationship of a four-phase clock coupled to the charge pump of FIG. 2.

The timing relationships of the individual clock signals ϕ1-ϕ4 that comprise a four-phase clock signal are shown in FIG. 3. Only one cycle of the waveform is shown. Clock signals ϕ1 and ϕ3 each have a rising edge that occurs simultaneously at time instant T1. Clock signal ϕ2 has a falling edge that occurs after time instant T1, and clock signal ϕ4 has a falling edge that occurs before time instant T1. Clock signals ϕ2 and ϕ4 each have a rising edge that occurs simultaneously at time instant T2. Clock signal ϕ1 has a falling edge that occurs after time instant T2, and clock signal ϕ3 has a falling edge that occurs before time instant T2. The designations A, B, C, D, E, and F in FIG. 3 refer generally to time intervals wherein the clock signals are in one of six possible logic states. This is also illustrated by the table below the time designations. For example, during time interval A, clocks signals ϕ1 and ϕ3 are in a logic high state (H), and clock signals ϕ2 and ϕ4 are in a logic low state (L).

The operation of charge pump 30 is discussed below with reference to FIGS. 2-3. To understand the operation of the charge pump 30 of FIG. 2, assume as an initial condition that circuit nodes P1-P4 and the output terminal 24 are clamped to the external positive power supply voltage minus a transistor threshold voltage (VCC−VT). (The clamping function provided by diodes D1-D5 is discussed in greater detail below with reference to FIG. 5.) Further assume that the four-phase clock signal is in the logic state associated with time interval A. In the transistion between time intervals A and B, clock signal ϕ3 changes state from a logic high to a logic low. The voltage on circuit node P3 changes from VCC−VT to a voltage below VCC−VT. Transistor Q5 turns off, isolating circuit node P1 from the output terminal 24. Transistors Q2 and Q4 also turn off, isolating circuit nodes P2 and P4 from VCC.

In the transistion between time intervals B and C, clock signals ϕ2 and ϕ4 each change state from a logic low to a logic high. The voltage on circuit nodes P2 and P4 increases to a voltage slightly less than 2 VCC−VT. The voltage is slightly less due to charge sharing with parasitic capacitances associated with each circuit node. Transistor Q6 turns on, discharging capacitor C2 and injecting current into the substrate or well through output terminal 24. Consequently, the voltage on circuit node P2 leaks down to the voltage on the output terminal 24, initially VCC−VT. Transistors Q1 and Q3 also turn on, precharging circuit nodes P1 and P3 to VCC. Transistor Q5 is off since the voltage on circuit nodes P1 and P3 is equal to VCC, and the output terminal 24 is at about VCC−VT. Neither of the current nodes of transistor Q5 are less than the gate by an amount more than the transistor threshold voltage, VT, a necessary condition for current conduction.

In the transition between time intervals C and D, clock signal ϕ1 changes state from a logic high to a logic low, which establishes a potential across capacitor C1 of approximately equal to VCC. Circuit node P1 stays high at a value also equal to VCC, since the first and second current nodes are at a voltage of about VCC, while the gate is at a voltage slightly less than 2 VCC−VT.

In the transition between time intervals D and E, clock signal ϕ4 changes state from a logic high to a logic low, and the voltage on circuit node P4 changes from about 2 VCC−VT to VCC−VT. Transistor Q6 turns off, isolating circuit node P2 from the output terminal 24. Transistors Q1 and Q3 also turn off, isolating circuit nodes P1 and P3 from VCC.

In the transition between time intervals E and F, clock signals ϕ1 and ϕ3 each change state from a logic low to a logic high. The voltage on circuit nodes P1 and P3 increases to a voltage slightly less than 2 VCC. Transistor Q5 turns on, discharging capacitor C1 and injecting current into the substrate or well through output terminal 24. Consequently, the voltage on circuit node P1 leaks down to the voltage on the output terminal. Transistors Q2 and Q4 also turn on, precharging circuit nodes P2 and P4 to VCC. Transistor Q6 is off since the voltage on circuit nodes P2 and P4 is equal to VCC, and the output terminal is at about VCC−VT.

In the final transition between time interval F and the original time interval A, clock signal ϕ2 changes state from a logic high to a logic low, which establishes a potential across capacitor C2 of approximately equal to VCC. Circuit node P2 stays high at a value also equal to VCC, since the first and second current nodes are at a voltage of about VCC, while the gate is at a voltage slightly less than 2 VCC. The process is repeated in sequence until the final voltage is reached, approximately equal to 2 VCC−VT.

Thus, the basic operation of the charge pump 30 begins by providing first and second charging transistors Q5 and Q6 and first and second capacitors C1 and C2. The sources of the charging transistors Q5 and Q6 are coupled to the substrate or well. Transistors Q5 and Q6 alternatively deliver current pulses to the substrate or well through output terminal 24. First and second capacitors C1 and C2 are respectively coupled to the charging transistors. Capacitors C1 and C2 provide the charge storage that is converted to a charge pulse when the capacitors are discharged. Thus, during the first half-cycle of the four-phase clock signal, the first capacitor C1 is discharged through the first charging transistor Q5 and the second capacitor C2 is precharged for the next half-cycle. Consequently, during the second half-cycle of the four-phase clock signal, the second capacitor C2 is discharged through the second charging transistor Q6 and the first capacitor C1 is precharged. As the alternative current pulses are delivered to the substrate or well, two for each clock cycle, the voltage on the substrate or well moves from the initial voltage of VCC−VT to the final desired voltage of 2 VCC−VT. Charge pump 30 is more efficient than charge pump 10 shown in FIG. 1. In charge pump 10, node 26 can attain a maximum voltage of VCC−VT, whereas in charge pump 30, nodes P1 and P2 can attain a maximum voltage of VCC. Therefore, an incremental charging voltage of VT delivers an incremental charge to the substrate or well that is not available in the prior art. Thus, the substrate or well reaches the final voltage bias level more quickly.

Figure 4:
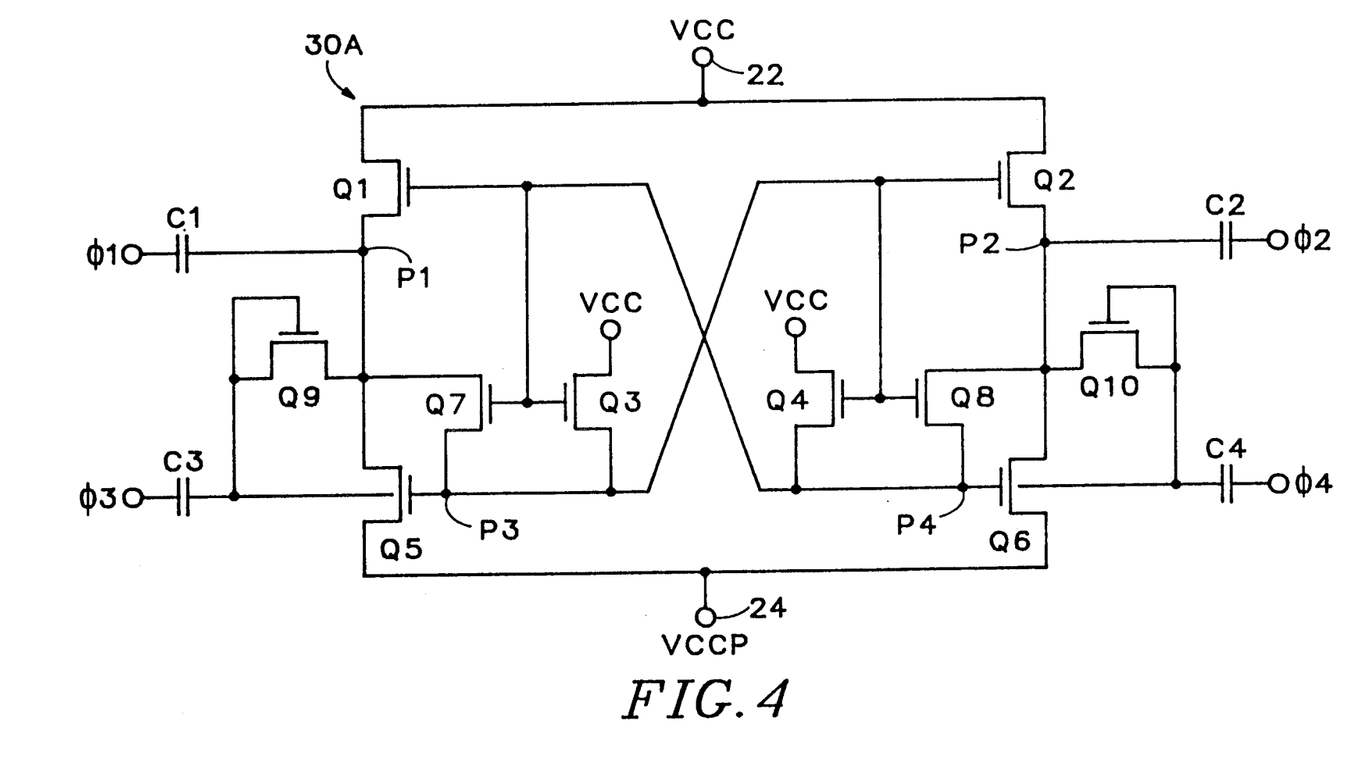
FIG. 4 is a schematic diagram of the charge pump of FIG. 2 further including a pair of level maintenance transistors and a pair of incremental charging diodes.

Referring now to FIG. 4, charge pump 30A includes a pair of level maintenance transistors Q7 and Q8 and a pair of incremental charging transistors Q9 and Q10 not shown in the basic charge pump 30. The gate of the first level maintenance transistor Q7 is coupled to the gate of the transistor Q1, the drain of the first level maintenance transistor Q7 is coupled to the drain of transistor Q5, and the source of the first level maintenance transistor Q7 is coupled to the gate of transistor Q5. The gate of the second level maintenance transistor Q8 is coupled to the gate of the transistor Q2, the drain of the first level maintenance transistor Q8 is coupled to the drain of transistor Q6, and the source of the first level maintenance transistor Q8 is coupled to the gate of transistor Q6. Charge pump 30A also includes a first incremental charging diode-connected transistor Q9 coupled between the gate and the drain of transistor Q5 and a second incremental charging diode-connected transistor coupled between the gate and the drain of transistor Q6.

Transistor Q7 turns on whenever transistors Q1, Q3, and Q6 turn on. Similarly, transistor Q8 turns on whenever transistors Q2, Q4, and Q5 turn on. Transistor Q7 maintains the gate and the source of transistor Q5 at the same potential such that the gate-to-source voltage is zero, and the transistor is off. The source of transistor Q5, which is also the output terminal 24, is typically more positive than the gate or drain as the substrate or well becomes more positively biased. Since transistor Q5 is off when transistor Q6 is on during one half-cycle, charge is delivered only to the substrate or well, and is not discharged from the substrate or well through transistor Q5. Likewise, transistor Q8 maintains the gate and source of transistor Q6 at the same potential such that the gate-to-source voltage is zero, and the transistor is off. The source of transistor Q6 is also typically more positive than the gate or drain as the substrate or well becomes more positively biased. Since transistor Q6 is off when transistor Q5 is on during the other half-cycle, charge is delivered only to the substrate or well, and is not discharged from the substrate or well through transistor Q6.

Transistors Q7 and Q8 further guarantee that transistors Q5 and Q6 remain off during the precharge cycle. The voltage between nodes P1 and P3, and the voltage between nodes P2 and P4 are clamped to a voltage less than VT by the action of transistors Q7 and Q8. This assures that transistors Q5 and Q6 do not turn on and rob charge from the substrate or well.

Diode-connected transistors Q9 and Q10 contribute incrementally to the charge delivered to the substrate or well by about 1% to 5%. Diode-connected transistor Q9 leaks the charge off of circuit node P3 onto the drain of charging transistor Q5. Circuit node P3 typically charges to a voltage of about 2 VCC during one half-cycle. This voltage is necessary to turn on transistor Q5 and discharge capacitor C1 to the substrate or well. However, the discharge through transistor Q5 typically takes less than a full half-cycle. The remaining charge on circuit node P3 is no longer needed for any circuit function and can itself be discharged to the substrate or well through transistors Q9 and Q7. Similarly, transistor Q10 provides the same discharge function for the excess charge stored on circuit node P4 when transistor Q6 is on and transistor Q5 is off. Capacitor C5 is coupled from the output terminal 24 to ground to help regulate and smooth out the voltage on the substrate or well once the final desired voltage is achieved.

Figure 5:
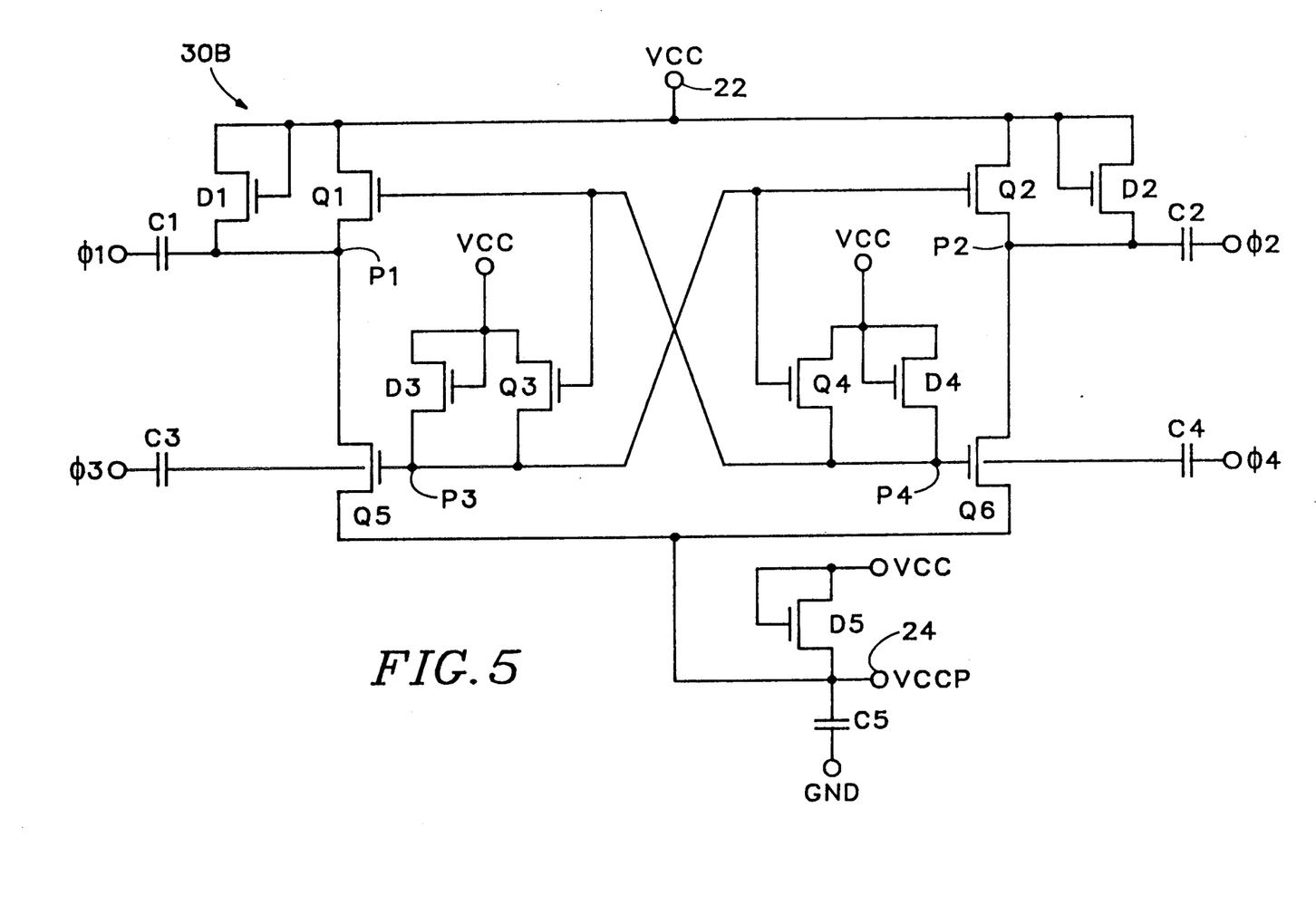
FIG. 5 is a schematic diagram of the charge pump of FIG. 2 further including five diode voltage clamps.

Referring now to FIG. 5, charge pump 30B includes five diode clamps D1–D5 not shown in the basic charge pump 30 for voltage clamping appropriate circuit nodes. Each diode clamp is a diode-connected FET. Voltage clamps D1–D4 each have a power node (anode) coupled to the positive supply voltage VCC and a clamping node (cathode) respectively coupled to the end of capacitors C1–C4 not coupled to the four-phase clock. A fifth voltage clamp D5 has a power node coupled to VCC and a clamping node coupled to the output terminal 24.

To improve the efficiency of the basic charge pump 30 it is desirable that circuit nodes be initially clamped to voltages that are as close to the final voltage on that circuit node as possible. Initially, the most positive voltage available in the circuit is VCC. Therefore circuit nodes P1-P4 and VCCP are all clamped to a voltage equal to (i.e. not more negative than) VCC−VT. Starting at this positive voltage eliminates at least one clock cycle delay in obtaining the final desired output voltage at terminal 24. After one clock cycle is passed, the diode clamps D1–D5 turn off, since all circuit nodes have reached at least a voltage equal to VCC. Thus, diode clamps D-D4 ensure that circuit nodes P1-P4 are precharged properly to VCC−VT, and the output is also precharged to VCC−VT. The charge pump 30 only has increase the output voltage from the initial value of VCC−VT to VCCP. Without the diode clamps D1–D5, the output voltage is initially at ground. Thus, the diode clamps D1–D5 provide a "head start" on charging the substrate or well, which minimizes charging time to the final desired voltage.

Figure 6A:
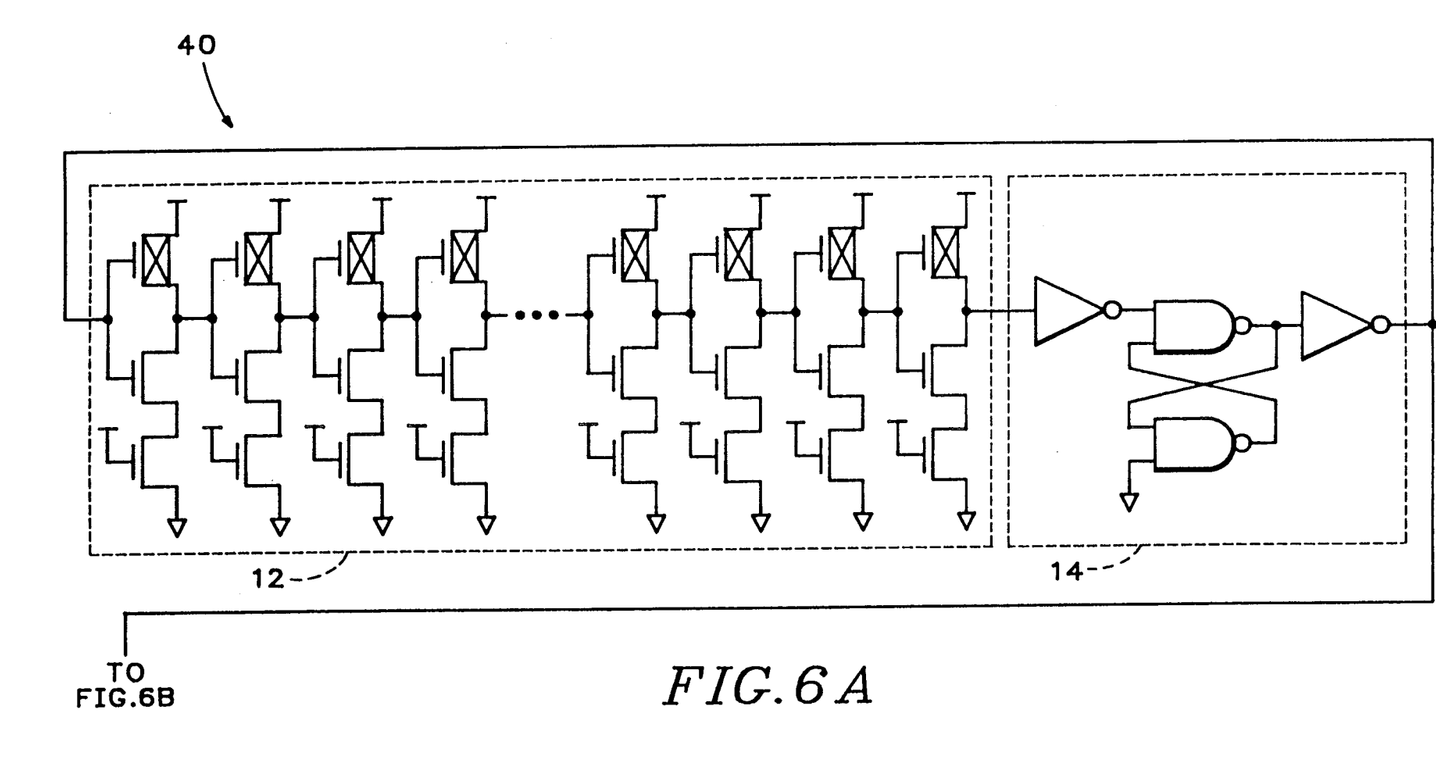
FIGS. 6A–6B form a detailed schematic diagram of a complete charge pump system according to the present invention including a ring oscillator and a four-phase clock generator.
Figure 6B:
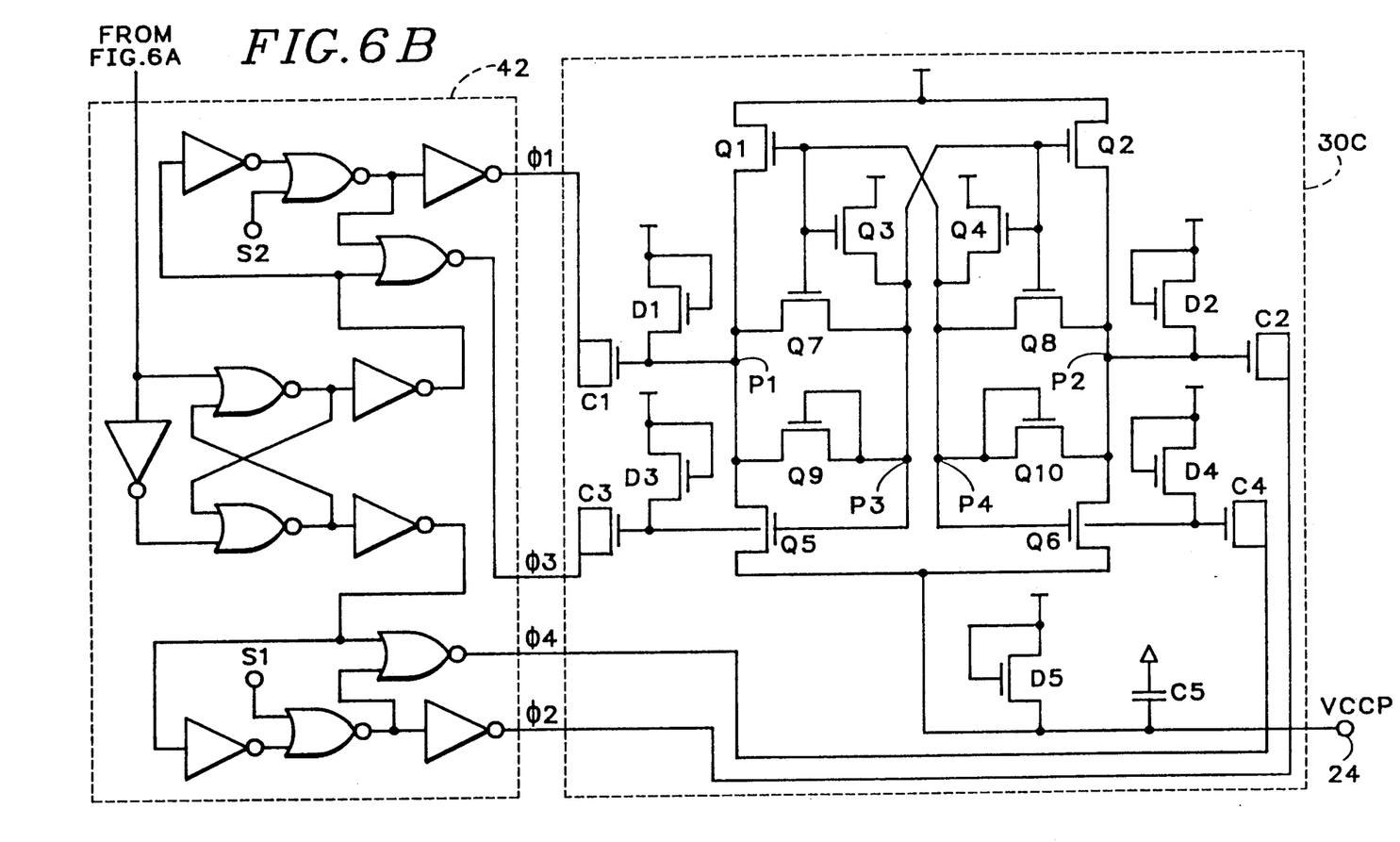

Referring now to FIGS. 6A and 6B, a complete charge pump system 40 is shown including a ring oscillator 12, conditioning circuit 14, four-phase clock generator 42, and a charge pump circuit 30C, including the combination of all clamps and additional transistors of charge pumps 30, 30A, and 30B. For simplicity, the positive voltage VCC in FIGS. 6A and 6B is depicted in the conventional manner as a short horizontal solid line. The ring oscillator 12 conventionally includes a number of serially-connected invertor stages. Each invertor stage includes a P-channel FET and two N-channel FETs. Alternatively, each invertor stage can have two serially-connected P-channel FETs and one N-channel FET, or simply one N-channel FET and one P-channel FET. The exact circuit design for the invertor stage depends upon the delay desired for each stage, and consequently, the final operating frequency of the ring oscillator 12. Conditioning circuit 14 includes two invertors and two cross-coupled NAND gates for providing an output signal with sharp-edge transitions between the logic low and high states. The output of the conditioning circuit 14 is fed back to the input of the ring oscillator 12 to start and maintain the oscillation. Conditioning circuit 14 serves to buffer the drive of the ring oscillator 12. The conditioning circuit 14 can be completely eliminated if ring oscillator 12 has sufficient drive capability. The four-phase clock generator 42 receives a one-phase clock signal from the ring oscillator 12 and conditioning circuit 14, and generates the four-phase clock signal including component clock signals $\phi1$-$\phi4$ having the timing characteristics shown in FIG. 3. The four-phase clock generator 42 creates clock signals $\phi1$-$\phi4$ by providing delay paths of unequal for the rising edge and the falling edge of the basic one-phase clock signal. The unequal delay paths are provided for an inverted and non-inverted half to create a total of four clock signals. It can be shown by those skilled in the art that clock generator 42 creates the clock signals shown in FIG. 3. It is also appreciated by those skilled in the art that many other such circuits for generating a four-phase clock signal with the characteristics shown in FIG. 3 are possible by an appropriate combination of logic elements.

Charge pump 30C is essentially the combination of all circuit elements contained in the previously discussed charge pumps 30, 30A, and 30B. The notable difference is that capacitors C1-C4 are shown as capacitor-connected transistors. A capacitor-connected transistor is a transistor wherein the gate forms one plate of a capacitor, and the drain and source are shorted together to form the other plate of the capacitor. The following values and W/L ratios are desirable for charge pump 30: (Note: W/L ratios are expressed in terms of the minimum feature size of the photolithographic process that is used. For example, in a 1 micron process, a designation of 15/1 refers to 15 microns by 1 micron. It should also be noted that the following W/L ratios are desirable for a particular application. These values can change for other applications and are dependent upon the operating frequency of the ring oscillator 12, the amount of charging current desired, as well as other factors.)

| Circuit element | W/L ratio or value |
| --- | --- |
| Q1 | 90/1 |
| Q2 | 90/1 |
| Q3 | 15/1 |
| Q4 | 15/1 |
| Q5 | 340/1 |
| Q6 | 340/1 |
| Q7 | 20/1 |
| Q8 | 20/1 |
| Q9 | 10/1 |
| Q10 | 10/1 |
| D1 | 12/1 |
| D2 | 12/1 |
| D3 | 6/1 |
| D4 | 6/1 |
| D5 | 200/1 |
| C1 | 120/200 |
| C2 | 120/200 |
| C3 | 120/25 |
| C4 | 120/25 |
| C5 | 300 pF |

In the above table, it is apparent that the charging transistors Q5 and Q6, capacitors C1, C2, C5, and diode clamp D5 are desirably made large in comparison to other circuit elements. The reason for the large size of these circuit elements is that they are involved in transferring large current pulses to the substrate or well. The next-largest circuit elements are transistors Q1 and Q2, and capacitors C3 and C4. The reason for the comparatively large size of these circuit elements is that capacitors C3 and C4 must have sufficient capacitance to precharge circuit nodes P1 and P2, but these circuit nodes must be quickly precharged (within one half-cycle of the clock signal).

It has been shown that the charge pump of the present invention is capable of quickly biasing the semiconductor substrate or well of an integrated circuit such that the guaranteed circuit performance can be more quickly achieved. The increase in efficiency is due, in part, to charging circuit nodes P1 and P2 fully to VCC, which increases the total amount of charge delivered to the substrate or well. The basic circuit configuration of the charge pump 30 includes only six transistors and four capacitors and therefore can be easily fabricated in an integrated circuit without occupying excessive die area. The charging transistors necessary to bias a given substrate or well can be reduced by a factor of at least two over the prior art because of the two charging pulses per clock cycle.

An all N-channel substrate pump, wherein all transistors, capacitors, and diodes are formed of N-channel transistors, has been described above for generating a positive voltage more positive than the most positive external power supply voltage. The following changes are desirable to create an all P-channel substrate pump for generating a negative voltage at the output terminal 24 suitable for biasing a P-type substrate, well, or the like. Each transistor Q1-Q10 is ideally replaced with a P-channel FET. Referring to FIGS. 2, 4, or 5, circuit node 22 is coupled to ground instead of VCC. Thus, transistors Q1-Q4, and diode clamps D1-D5 are each coupled at one end to ground instead of VCC. Each of the clock signals retains the relative timing relationships shown in FIG. 3, however in the P-channel version, however each clock signal $\phi1$-$\phi4$ is inverted in polarity. The final voltage at the output terminal 24 is equal to VT−2 VCC, and is sometimes designated VBB.

Having illustrated and described the principles of my invention in a preferred embodiment thereof, it is apparent to those skilled in the art that the invention can be modified in arrangement and detail without departing from such principles. I claim all modifications coming within the spirit and scope of the accompanying claims.

I claim:

1. A high efficiency charge pump comprising:
   first and second charging transistors for delivering current to a substrate or well;
   first and second capacitors having a first node respectively coupled to the first and second charging transistors and a second node for respectively receiving first and second clock signals;
   a control circuit including first and second symmetrical halves coupled to the first and second charging transistors for discharging the first capacitor through the first charging transistor and precharging the second capacitor during a first time interval and for discharging the second capacitor through the second charging transistor and precharging the first capacitor during a second time interval;
   a third capacitor having a first node coupled to the first symmetrical control circuit half and a second node for receiving a third clock signal; and
   a fourth capacitor having a first node coupled to the second symmetrical control circuit half and a second node for receiving a fourth clock signal.

2. A high efficiency charge pump as in claim 1 in which
   the first and third clock signals each have a transition from a first logic state to a second logic state that occurs simultaneously at a first time instant, the second clock signal has a transition from the second logic state to the first logic state that occurs after the first time instant, and the fourth clock signal has a transition from the second logic state to the first logic state that occurs before the first time instant, and
   the second and fourth clock signals each have a transition from the first logic state to the second logic state that occurs simultaneously at a second time instant, the first clock signal has a transition from the second logic state to the first logic state that occurs after the second time instant, and the third clock signal has a transition from the second logic state to the first logic state that occurs before the second time instant.

3. A method for efficiently charging a substrate or well, the method comprising the steps of:
   providing first and second charging transistors;
   coupling the first and second charging transistors to the substrate or well for delivering current thereto;
   coupling first and second capacitors respectively to the first and second charging transistors;
   discharging the first capacitor through the first charging transistor and precharging the second capacitor during a first time interval;
   discharging the second capacitor through the second charging transistor and precharging the first capacitor during a second time interval;
   coupling a third capacitor to a control node of the first charging transistor; and
   coupling a fourth capacitor to a control node of the second charging transistor.

4. A method for efficiently charging a substrate or well as in claim 3 further comprising the steps of:
   providing first, second, third, and fourth clock signals; and
   energizing the first, second, third, and fourth capacitors with the respective first, second, third, and fourth clock signals.

5. A method for efficiently charging a substrate or well as in claim 3 further comprising the steps of:
   providing first, second, third, and fourth clock signals,
   the first and third clock signals each having a transition from a first logic state to a second logic state that occurs simultaneously at a first time instant and the second and fourth clock signals each having a transition from the first logic state to the second logic state that occurs simultaneously at a second time instant; and
   energizing the first, second, third, and fourth capacitors with the respective first, second, third, and fourth clock signals.

6. A method for efficiently charging a substrate or well as in claim 3 further comprising the steps of:
   providing first, second, third, and fourth clock signals,
   the second clock signal having a transition from a first logic state to a second logic state that occurs after a first time instant, and the fourth clock signal having a transition from the first logic state to the second logic state that occurs before a first time instant,
   the first clock signal having a transition from the first logic state to the second logic state, that occurs after a second time instant, and the third clock signal having a transition from the first logic state to the second logic state that occurs before a second time instant; and
   energizing the first, second, third, and fourth capacitors with the respective first, second, third, and fourth clock signals.

7. A high efficiency charge pump comprising:
   first, second, third, fourth, fifth, and sixth transistors each having a gate, a first current node, and a second current node;
   first, second, third, and fourth capacitors each having a first node and a second node; and
   an output terminal for biasing a substrate or well, wherein
   the first current nodes of the first, second, third, and fourth transistors are coupled together and to a source of supply voltage,
   the second current node of the first transistor and the first current node of the fifth transistor are coupled together and to the first node of the first capacitor, the second node of the first capacitior receiving a first clock signal,
   the second current node of the second transistor and the first current node of the sixth transistor are coupled together and to the first node of the second capacitior, the second node of the second capacitor receiving a second clock signal,
   the second current node of the third transistor and the gates of the second, fourth, and fifth transistors are coupled together and to the first node of the third capacitor, the second node of the third capacitor receiving a third clock signal,
   the second current node of the fourth transistor and the gates of the first, third, and sixth transistors are coupled together and to the first node of the fourth capacitor, the seocnd node of the fourth capacitor receiving a fourth clock signal, and
   the second current nodes of the fifth and sixth transistors are coupled together and to the output terminal.

8. A high efficiency charge pump as in claim 7 in which the first, second, third, fourth, fifth, and sixth transistors each comprise an N-channel field-effect transistor.

9. A high efficiency charge pump as in claim 7 in which the first, second, third, fourth, fifth, and sixth transistors each comprise a P-channel field-effect transistor.

10. A high efficiency charge pump as in claim 7 in which the first second, third, and fourth capacitors each comprise an N-channel, capacitor-connected field-effect transistor.

11. A high efficiency charge pump as in claim 7 in which the first, second, third, and fourth capacitors each comprise a P-channel, capacitor-connected field-effect transistor.

12. A high efficiency charge pump as in claim 7 further comprising:
first, second, third, and fourth voltage clamps each having a power node coupled to the source of supply voltage and a clamping node respectively coupled to the second node of first, second, third, and fourth capacitors; and
a fifth voltage clamp having a power node coupled to the source of supply voltage and a clamping node coupled to the output terminal.

13. A high efficiency charge pump as in claim 7 further comprising first and seocnd level maintenance transistor each having a gate, a first current node, and a second current node, wherein
the gate of the first level maintenance transistor is coupled to the gate of the first transistor, the first current node of the first level maintenance transistor is coupled to the first current node of the fifth transistor, and the second current node of the first level maintenance transistor is coupled to the gate of the fifth transistor, and
the gate of the second level maintenance transistor is coupled to the gate of the second transistor, the first current node of the second level maintenance transistor is coupled to the first current node of the sixth transistor, and the second current node of the second level maintenance transistor is coupled to the gate of the sixth transistor.

14. A high efficiency charge pump as in claim 7 further comprising:
a first incremental charging diode coupled between the gate and the first current node of the fifth transistor; and a second incremental charging diode coupled between the gate and the first current node of the sixth transistor.

15. A high efficiency charge pump as in claim 7 further comprising a capacitor coupled between the output terminal and ground.

16. A high efficiency charge pump as in claim 7 in which
the first and third clock signals each have a transition from a first logic state to a second logic state that occurs simultaneously at a first time instant, the second clock signal has a transition from the second logic state to the first logic state that occurs after the first instant, and the fourth clock signal has a transition from the second logic state to the first logic state that occurs before the first time instant, and
the second and fourth clock signals each have a transition from the first logic state to the second logic state that occurs simultaneously at a second time instant, the first clock signal has a transition from the second logic state to the first logic state that occurs after the second time instant, and the third clock signal has a transition from the second logic state to the first logic state that occurs before the second time instant.

17. A high efficency charge pump as in claim 12 in which the first, second, third, fourth, and fifth voltage clamps each comprise an N-channel, diode-connected field-effect transistor.

18. A high efficency charge pump as in claim 12 in which the first, second, third, fourth, and fifth voltage clamps each comprise a P-channel, diode-connected field-effect transistor.

19. A high efficiency charge pump as in claim 13 in which the first and seocnd level maintenance transistors each comprise an N-channel field-effect transistor.

20. A high efficiency charge pump as in claim 13 in which the first and second level maintenance transistors each comprise a P-channel field-effect transistor.

21. A high efficiency charge pump as in claim 14 in which the first and second incremental charging diodes each comprise an N-channel, diode-connected field-effect transistor.

22. A high efficiency charge pump as in claim 14 in which the first and second incremental charging diodes each comprise a P-channel, diode-connected field-effect transistor.

23. A high efficiency charge pump as in claim 15 in which the value of the capacitor is about 300 picofarads.

* * * * *

UNITED STATES PATENT AND TRADEMARK OFFICE
CERTIFICATE OF CORRECTION

PATENT NO.  :  5,126,590

DATED       :  June 30, 1992

INVENTOR(S) :  Wen-Foo Chern

It is certified that error appears in the above-identified patent and that said Letters Patent is hereby corrected as shown below:

Column 10, line 54:   Change "capacitior" to --capacitor--;

line 64:   Change "seocnd" to --second--;

Column 11, line 29:   Change "seocnd" to --second--;

Column 12, line 14:   Insert "time" between "first" and "instant"; and line 36:   Change "seocnd" to --second--.

Signed and Sealed this

Tenth Day of August, 1993

Attest:

MICHAEL K. KIRK

*Attesting Officer*      *Acting Commissioner of Patents and Trademarks*